Patented July 6, 1954

2,683,136

UNITED STATES PATENT OFFICE 2,683,136

COPOLYMERS OF HYDROXYACETIC ACID WITH OTHER ALCOHOL ACIDS

Norton A. Higgins, Wilmington, Del., assignor to E. I. du Pont de Nemours and Company, Wilmington, Del., a corporation of Delaware No Drawing. Application October 25, 1950, Serial No. 192,137

5 Claims. (Cl. 260—78.3)

This invention relates to copolymers of hydroxyacetic acid with other alcohol acids and to a process for preparing them, and is more particularly concerned with orientable linear copolyesters of monohydroxy monocarboxylic alcohol acids in which hydroxyacetic acid predominates.

In United States Patent No. 2,362,511 issued November 14, 1944, to Wilbur O. Teeters it is disclosed that useful copolymers based on hydroxyacetic acid, also known as glycolic acid, may be prepared by a process in which hydroxyacetic acid is reacted at a temperature between 150° C. and 300° C. in the presence of water with a bifunctional compound other than hydroxyacetic acid containing one free hydroxyl and one free carboxyl group until substantially all of the water has been removed from the reaction mixture. Bifunctional compounds disclosed include hydroxy-carboxylic acids, such as lactic acid, and partially condensed phthalic-glycerides modified with long chain fatty acids or abietic acid (rosin).

The above copolymers are useful for a variety of purposes, e. g., as ingredients in coating compositions and adhesives, the copolymers in which hydroxyacetic acid is modified with a resin of the alkyd type, such as the above mentioned fatty acid or rosin modified glyceryl phthalates, being especially valuable for such uses. However, it has not been possible heretofore to prepare copolymers of hydroxy-carboxylic acids, containing hydroxyacetic acid as a major ingredient, which could be formed into tenacious, orientable fibers and self-supporting films. For the formation of orientable fibers and films, linear copolymers of hydroxyacetic acid must have a fairly high molecular weight, as indicated by such tests as manual spinnability and viscosity and melting point measurements.

Accordingly it is an object of the present invention to provide new and useful copolymers of monohydroxy monocarboxylic alcohol acids containing hydroxyacetic acid as a major ingredient. It is another object of the invention to prepare such copolymers of hydroxyacetic acid which are suitable for the formation of orientable fibers and self-sustaining films. Other objects of the invention will become apparent from the following description and the accompanying claims.

In accordance with the present invention it has been found that copolymers suitable for forming orientable fibers and self-supporting films may be prepared by heating hydroxyacetic acid with a lesser amount of another monohydroxy monocarboxylic alcohol acid in the presence of triphenyl phosphite stabilizer and antimony trioxide catalyst at 160° to 230° C. and atmospheric pressure until rapid evolution of water ceases, and then heating the reaction mixture under vacuum at temperatures of from 195° to 245° C. until a high degree of polymerization is obtained.

The amount of triphenyl phosphite stabilizer used should be from 0.05 to 0.2 percent of the combined weight of hydroxy acids used, about 0.1 percent being a desirable amount to prevent decomposition reactions. The amount of antimony trioxide catalyst should be from 0.005 to 0.02 percent of the weight of the hydroxy acids, about 0.01 percent being the preferred amount.

Water will commence to distill slowly from the reaction mixture at about 160° C., but the temperature is preferably raised sufficiently to produce a fairly rapid evolution of water so that this step of the reaction is complete within about 0.5 to 2.0 hours. A temperature of 195° to 205° C. is preferred for most reactions. Higher temperatures favor side reactions, such as the formation of glycolide, which becomes excessive above 230° C.

The vacuum polymerization is preferably conducted under a high vacuum of from 0 to 5 mm. of mercury absolute pressure to remove by-products such as glycolide. For most reactions the heating should be in the range of from 195° to 220° C., although higher temperatures may be desirable in some cases. Temperatures above 245° C. cause the material to darken and should be avoided.

The length of time required for the vacuum polymerization varies with the type of copolymer and the degree of polymerization required, at least 30 to 48 hours generally being necessary to obtain a fairly high degree of polymerization when using the preferred conditions indicated above. A high degree of polymerization is necessary for the formation of tenacious, orientable fibers and self-supporting films. For a particular type of copolymer an indication of the degree of polymerization is provided by viscosity and melting point measurements, but such tests are apt to be misleading when comparing different types of copolymers. A manual test for spinnability and orientability of the resulting fibers, while not providing a numerical basis for comparison, is the simplest generally applicable indication of when the minimum degree of polymerization has been achieved.

The test for spinnability can readily be made by touching the surface of the molten copolymer with a glass stirring rod and then drawing the rod away slowly to form a fiber. Since temperature can be a factor in this test, the copolymer should be heated to a temperature of not more than a degree or two above the melting point. If a fiber is formed in this test, orientability is determined by subjecting the fiber to tension. Most orientable fibers can be extended considerably beyond the point of elastic recovery without breaking, e. g., can be drawn to retain a length two or more times the original length when the tension is released, and also usually exhibit the property of necking down during drawing in the same manner as nylon fibers. An exception has been noted in the case of copolymer fibers exhibiting elastomeric properties, which can be oriented but do not neck down in the process.

Inherent viscosity measurements of solutions of polymers provide a numerical indication of the degree of polymerization of a particular type of copolymer, but are not reliable for comparing different types of copolymers. A viscosimeter flow time is determined at 30° C. for a 0.5 percent solution of the copolymer in Fomal solvent (10 parts phenol and 7 parts trichlorophenol) and for the solvent alone. Since some polymer degradation occurs in hot Fomal solution, all conditions must be standardized in order to make the resulting error as constant as possible. The inherent viscosity is calculated as follows:

$$\text{Inherent viscosity} = 200 \left[ \frac{\text{solution flow time}}{\text{solvent flow time}} - 1 \right]$$

The minimum value will vary with the type of copolymer, but a general observation is that orientable fibers cannot be formed from copolymers of the types disclosed herein if the inherent viscosity is less than 0.2 when determined as above, and much higher values are desirable in most cases.

The melting point provides an additional indication of the degree of polymerization. This could be determined by the capillary tube method used for crystalline organic compounds. Since the copolymers are amorphous rather than crystalline, it is preferable to use the polymer stick temperature, which gives results about 20° C. lower for these copolymers. The polymer stick temperature is determined by repeatedly drawing a piece of the copolymer across the face of a brass block, as the temperature of the block is slowly raised, and noting the temperature at which the copolymer first leaves a molten streak on the block. This temperature should be at least 150° C. for the copolymers disclosed herein for them to be suitable for forming useful orientable fibers and self-sustaining films. Furthermore a lower stick temperature is not desired for many uses of the copolymers because they would have an undesirably low softening temperature. By the above process hydroxyacetic acid can be copolymerized with smaller amounts of any monohydroxy mono-carboxylic alcohol acid of three or more carbon atoms to yield orientable linear copolyesters with plastic or elastomeric properties. A desirable series of copolymers, suitable for forming fibers which will neck down and orient when cold drawn, are prepared by copolymerizing hydroxyacetic acid with 5% to 25 percent by weight of one or more compounds represented by the formula, HO—R—COOH, where R is a saturated aliphatic hydrocarbon group of two to about five carbon atoms, e. g., lactic, hydracrylic and hydroxypivalic acids.

Copolymers having rubbery (elastomeric) properties may be obtained with longer chain length omega-hydroxy acids, e. g., 10 percent or more of 7-hydroxy-5-methyl-heptanoic acid or 11-hydroxyundecanoic acid.

Copolymers can also be prepared with alcohol carboxylic acids which contain an aromatic nucleus in their structure, such as those represented by the formula, $HOCH_2(Ar)COOH$, where Ar is an aromatic nucleus of 6 to 10 carbon atoms and is preferably a hydrocarbon except that ether linkages may be present. Examples of these are p-hydroxyethoxybenzoic acid, p-hydroxyethoxyphenylacetic acid, p-hydroxyethoxyphenylbutyric acid, p-hydroxymethylbenzoic acid and mandelic acid. These are difficult to copolymerize with hydroxyacetic acid and require a much longer polymerization cycle than the aliphatic alcohol acids to obtain spinnable, orientable copolymers. The first three of the above examples contain ether linkages. Such compounds behave in the same way as those in which the hydroxyl and carboxyl radicals are attached to a hydrocarbon chain.

Low molecular weight glycol-dibasic acid linear condensation products, which may be considered as monohydroxy monocarboxylic acids, may be copolymerized with hydroxyacetic acid, or low molecular weight polymers thereof, to yield spinnable, orientable fibers. These include the oxalic, adipic, sebacic, maleic and terephthalic acid esters of ethylene glycol or hexamethylene glycol, which should be condensed in substantially equimolecular proportions. The reason for this is that compounds which do not contain both carboxyl and alcoholic hydroxyl radicals act as end groupers and limit the molecular weight of the copolymer, although up to about 1 percent, based on the weight of the copolymer, can be tolerated and still obtain spinnable, orientable copolymers. On the other hand, polyfunctional hydroxy carboxylic acid compounds, such as tartaric acid, yield undesirable insoluble, cross-linked copolymers when present to the extent of 5 percent or more.

One of the principal advantages of the copolymers over straight polyhydroxyacetic ester is that the solubility in organic solvents is improved and water sensitivity is decreased in most cases. Thus most of the copolymers are soluble in dimethylformamide whereas unmodified polyhydroxyacetic ester is not. Under comparable conditions films of copolymers of hydroacetic acid with 10 percent of either hydroxypivalic acid or p-hydroxyethoxybenzoic acid withstood boiling water for longer times than the unmodified polyhydroxyacetic ester. A further advantage is that some of the modifications can be copolymerized to obtain clear, transparent films or massive chunks more readily than the unmodified hydroxyacetic acid polymer.

The invention is further illustrated by the examples shown in the tables, which are not to be construed as limiting the invention. In each example hydroxyacetic acid was copolymerized with the amount of a hydroxy carboxylic acid or other modifier indicated, in the presence of 0.1 percent of triphenyl phosphite stabilizer and 0.01 percent of antimony trioxide catalyst, based on the weight of the acids. The heating cycle is shown. The mixture was heated at 197° C. and atmospheric pressure for from 0.5 to 1.0 hour until evolution of water substantially ceased. The pressure was then lowered to less than 1 mm. of mercury absolute pressure and the heating was resumed under this vacuum at the temperatures and for the lengths of time indicated.

In Example 4 the hydroxypivalic acid was added as the methyl ester. Hydrolysis took place under the reaction conditions, and methyl alcohol distilled off with the water. In Example 8 the hexamethylene glycol-sebacic acid condensate was prepared by heating equimolecular proportions at 197° C. and atmospheric pressure for 0.75 hour, at 197° C. under vacuum for 5.5 hours, and at 245° C. under vacuum for 2.0 hours. The resulting low molecular weight polymer was mixed with partially polymerized hydroxyacetic acid and the mixture was copolymerized as indicated in the table. In Example 9 a 55/45 ethylene glycol-terephthalic acid/ethylene glycol-sebacic acid polymer was prepared and then copolymerized with partially polymerized hydroxyacetic acid as indicated.

The properties of the resulting copolymers were evaluated by the methods discussed previously. Solubility was determined in chloroform, meta cresol, cyclohexane, cyclohexanone, dimethylformamide, 80 percent ethanol, formic acid, water and xylene. All were soluble in Fomal (10 parts phenol and 7 parts trichlorophenol). Table I illustrates copolymers which formed orientable fibers and self-sustaining films. The modified hydroxyacetic acid polymers of Table II were not spinnable and did not form self-sustaining films.

While the above examples illustrate certain principles of the present invention, many different embodiments may be made without departing from the spirit and scope thereof, and it is to be understood that the invention is not limited to the specific embodiments disclosed except to the extent defined in the appended claims.

What is claimed is:

1. A linear copolymer of monohydroxy monocarboxylic alcohol acids of 2 to 11 carbon atoms in which hydroxyacetic acid predominates and characterized by having an inherent viscosity greater than 0.2 and being manually spinnable into orientable fibers by touching the molten copolymer with a glass rod and drawing the rod away slowly.

2. A linear copolymer of hydroxyacetic acid with 5% to 25% by weight of the copolymer of another monohydroxy monocarboxylic alcohol acid of 3 to 11 carbon atoms, said copolymer being characterized by having an inherent viscosity greater than 0.2 and by being manually spinnable

TABLE I

*Spinnable and orientable copolymers of hydroxyacetic acid*

| Example | Modifier | Heating Cycle °C. | Pressure | Hours | Inherent Viscosity | Polymer Stick Temp. | Plastic Characteristics | Appearance | Soluble In— |
|---|---|---|---|---|---|---|---|---|---|
| 1 | 10% Lactic Acid | 197 / 197 / 218 / 245 | Atm. / Vac. / Vac. / Vac. | 0.5 / 21.5 / 6.3 / 1.0 | 0.48 | 158–160 | Very Tough | Lt. Brown Translucent. | m-Cresol; Dimethylformamide. |
| 2 | 25% Lactic Acid | 197 / 197 | Atm. / Vac. | 1.0 / 28.8 | 0.41 | 162–164 | Tough | Lt. Brown Transparent. | m-Cresol Formic Acid; Dimethylformamide; Cyclohexanone. |
| 3 | 10% Hydroxypivalic Acid. | 197 / 197 / 218 | Atm. / Vac. / Vac. | 2.3 / 2.3 / 26.5 | 0.38 | 192 | Brittle | Dark Brown Opaque. | m-Cresol. |
| 4 | 25% Hydroxypivalic | 197 / 197 / 218 | Atm. / Vac. / Vac. | 3.0 / 26.0 / 1.0 | 0.21 | 167–168 | ----do----- | Cream Opaque | m-Cresol; Dimethylformamide; Formic Acid. |
| 5 | 10% 7-Hydroxy-5-methyl-Heptanoic Acid. | 197 / 197 / 245 | Atm. / Vac. / Vac. | 0.6 / 22.0 / 2.5 | 0.20 | 176–178 | Rubbery | ----do---- | Do. |
| 6 | 10% 11-Hydroxy-undecanoic Acid. | 197 / 197 / 218 | Atm. / Vac. / Vac. | 1.0 / 1.0 / 23.0 | 0.26 | 179 | ----do----- | ----do---- | Do. |
| 7 | 5% p-Hydroxy-ethoxybenzoic Acid. | 197 / 197 / 218 | Atm. / Vac. / Vac. | 0.66 / 5.0 / 30.0 | 0.22 | 194 | Brittle | ----do---- | m-Cresol; Dimethylformamide. |
| 8 | 10% Ethylene Glycol-Sebacic Acid Condensate. | 241 | Vac. | 7.25 | 0.37 | 201 | Very Tough | Brown Opaque | Do. |
| 9 | 10% Ethylene Glycol-Terephthalic-Sebacic Acid Polymer. | 245–275 | Vac. | 1.0 | 0.52 | 204 | ----do----- | Tan Opaque | Do. |

TABLE II

*Modified polymers of hydroxyacetic acid—not spinnable*

| Example | Modifier | Heating Cycle °C. | Pressure | Hours | Inherent Viscosity | Polymer Stick Temp. | Plastic Characteristics | Appearance | Soluble In— |
|---|---|---|---|---|---|---|---|---|---|
| 10 | 2.5% Tartaric Acid | 197 / 197 / 218 | Atm. / Vac. / Vac. | 0.5 / 1.6 / 21.0 | 0.32 | 191 | Brittle | Dark Brown Opaque. | Fomal. |
| 11 | 25% Tartaric Acid | 197 / 197 | Atm. / Vac. | 0.5 / 0.5 | ------ | Infusible | ----do----- | ---------- | Insoluble. |
| 12 | 10% Malic Acid | 197 / 197 | Atm. / Vac. | 0.75 / 13.0 | 0.08 | 171 | ----do----- | Lt. Brown Opaque | m-Cresol Dimethylformamide Formic Acid. |
| 13 | 2.5% Hexamethylene Glycol. | 197 / 197 / 218 | Atm. / Vac. / Vac. | 0.5 / 18.0 / 5.8 | ------ | ---------- | ----do----- | Dark Brown Opaque. | |
| 14 | 2.5% Sebacic Acid | 197 / 197 / 218 | Atm. / Vac. / Vac. | 1.3 / 1.0 / 21.0 | 0.18 | 186 | ----do----- | White Opaque | m-Cresol Dimethylformamide. | into orientable fibers by touching the molten copolymer with a glass rod and drawing the rod away slowly.

3. A linear copolymer of hydroxyacetic acid with up to 25% by weight of the copolymer of another hydroxy acid represented by the formula HO—R—COOH, where R is a saturated aliphatic hydrocarbon group of 2 to 5 carbon atoms, said copolymer being characterized by having an inherent viscosity greater than 0.2 and by being manually spinnable into orientable fibers by touching the molten copolymer with a glass rod and drawing the rod away slowly.

4. A linear copolymer of hydroxyacetic acid with a lesser amount of an omega-hydroxy acid represented by the formula HO—R—COOH, where R is a saturated aliphatic hydrocarbon group of 7 to 11 carbon atoms, said copolymer being characterized by having an inherent viscosity greater than 0.2 and by being manually spinnable into orientable fibers by touching the molten copolymer with a glass rod and drawing the rod away slowly.

5. A linear copolymer of hydroxyacetic acid with a lesser amount of an alcohol carboxylic acid represented by the formula $$HOCH_2(Ar)COOH$$

where Ar is an aromatic nucleus of 6 to 10 carbon atoms, said copolymer being characterized by having an inherent viscosity greater than 0.2 and by being manually spinnable into orientable fibers by touching the molten copolymer with a glass rod and drawing the rod away slowly.

References Cited in the file of this patent

UNITED STATES PATENTS

| Number | Name | Date |
|---|---|---|
| 2,362,511 | Teeters | Nov. 14, 1944 |

FOREIGN PATENTS

| Number | Country | Date |
|---|---|---|
| 550,837 | Great Britain | Jan. 27, 1943 |